United States Patent Office 3,415,842
Patented Dec. 10, 1968

3,415,842
N-GUANIDINO-LOWER ALKYL-ISOINDOLES
Renat Herbert Mizzoni, Long Valley, and Robert Paul Mull, Florham Park, N.J., assignors to Ciba Corporation, New York, N.Y., a corporation of Delaware
No Drawing. Filed Jan. 17, 1962, Ser. No. 166,927
15 Claims. (Cl. 260—326.1)

ABSTRACT OF THE DISCLOSURE

Compounds of the formula

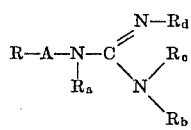

in which R stands for a group of the formula

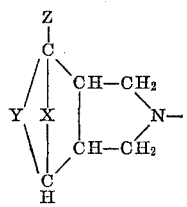

in which X stands for a methylene group —$CH_2$, a 2,2-propylene group

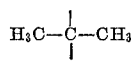

an oxy group —O— or a thio group —S—, Y stands for 1,2-ethylene—$CH_2$—$CH_2$— or 1,2-ethylene—CH=CH—, and Z is hydrogen or methyl, A is lower alkylene, each of the groups $R_a$ and $R_b$ stands primarily for hydrogen, as well as lower alkyl, and each of the groups $R_c$ and $R_d$ is primarily hydrogen, as well as lower alkyl or acyl, or acid addition salts thereof, as well as process for the preparation of these compounds. The compounds of the invention are useful for the treatment of hypertension.

---

The present invention concerns guanidine compounds or salts thereof. Particularly, it relates to compounds of the formula:

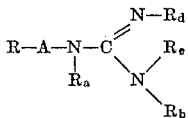

in which R stands for a group of the formula:

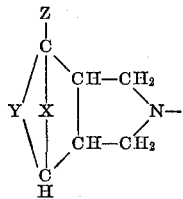

in which X stands for a methylene group —$CH_2$, a 2,2-propylene group

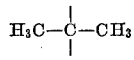

an oxy group —O— or a thio group —S—, Y stands for 1,2-ethylene—$CH_2$—$CH_2$— or 1,2-ethylene—CH=CH— and Z is hydrogen or methyl, A is lower alkylene, each of the groups $R_a$ and $R_b$ stands primarily for hydrogen, as well as lower alkyl, and each of the groups $R_c$ and $R_d$ is primarily hydrogen, as well as lower alkyl or acyl, or acid addition salts thereof, as well as process for the preparation of these compounds.

The radical R having the previously-given formula, stands primarily for a group of the formula:

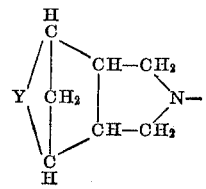

in which Y stands for an 1,2-ethylene or a 1,2-ethenylene group.

The alkylene radical A has from one to four carbon atoms, especially from two to three carbon atoms, which may be arranged in a straight or a branched carbon chain, and is represented by 1,2-ethylene, 1-methyl-1,2-ethylene, 2-methyl-1,2-ethylene or 1,3-propylene, as well as methylene, 1,4-butylene and the like.

As previously mentioned, each of the groups $R_a$ and $R_b$ stands primarily for hydrogen; they may also represent lower alkyl having from one to four carbon atoms, particularly methyl, as well as ethyl, n-propyl, isopropyl, n-butyl and the like.

The groups $R_c$ and $R_d$, which are primarily hydrogen, may also stand for lower alkyl, having from one to four carbon atoms, particularly methyl, as well as ethyl, n-propyl, isopropyl, n-butyl and the like, or acyl, which represents the acyl radical of an organic carboxylic acid, such as a lower alkanoic acid, e.g. acetic propionic, pivalic, 2,2-dimethyl-butyric acid and the like, a lower alkoxy-lower alkanoic acid, e.g. methoxy-acetic, trimethoxy-pivalic acid and the like, benzoic acid, lower alkoxy-benzoic acid, e.g. 4-methoxy-benzoic, 3,4,5-trimethoxy-benzoic acid and the like, or any other suitable organic carboxylic acid.

Salts of the compounds of this invention are particularly pharmaceutically acceptable, non-toxic acid addition salts, particularly with inorganic acids, e.g. hydrochloric, hydrobromic, nitric, sulfuric, phosphoric acids and the like, as well as with organic carboxylic acids, e.g. acetic, oxalic, malonic, succinic, maleic, hydroxymaleic, dihydroxymaleic, fumaric, malic, tartaric, citric, benzoic acid and the like, or with organic sulfonic acids, e.g. methane sulfonic, ethane sulfonic, 2-hydroxyethane sulfonic, ethane 1,2-disulfonic, p-toluene sulfonic acid and the like. Semi-, mono- or poly-salts may be formed depending on the procedure used for the preparation of the salts.

The compounds of this invention, when administered orally, cause a lowering of the blood pressure, and can, therefore, be used in the treatment of hypertension. Particularly useful are the compounds of the formula:

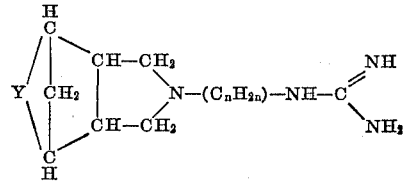

in which Y stands for 1,2-ethylene or 1,2-ethenylene, and the letter $n$ stands for an integer from 2 to 3, and the group —($C_nH_{2n}$)— separates the guanidino group from the imino-nitrogen by from two to three carbon atoms, and particularly the pharmaceutically acceptable, non-toxic acid addition salts thereof, such as those with strong inorganic acids.

The new compounds of this invention may be used in the form of pharmaceutical preparations, suitable for enteral or parenteral administration, which contain the new guanidine compounds or the salts thereof in admixture with a solid or liquid carrier. For making up the preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene gycos or any other known carrier used in pharmaceutical preparations. The latter may be in the solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other useful substances.

The new guanidine compounds of this invention may be prepared by converting in a compound of the formula:

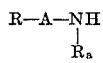

in which R, $R_a$ and A have the previously-given meaning, or a salt thereof, the amino group into a guanidino group having the formula:

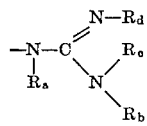

in which $R_a$, $R_b$, $R_c$ and $R_d$ have the previously-given meaning, and, if desired, converting a resulting salt into the free compound or into another salt, and/or, if desired, converting a free compound into a salt thereof, and/or, if desired, replacing in a resulting compound, in which the groups $R_c$ and/or $R_d$ stand for hydrogen, such hydrogen by acyl, and/or, if desired, removing in a resulting compound having a double bond in the ring system, such double bond by reduction.

The reagents of choice for the conversion of an amino group into a guanidino group are S-lower alkyl-isothioureas or O-lower alkyl-isoureas, particularly those having the formula:

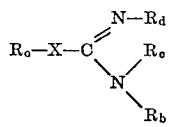

in which $R_b$, $R_c$ and $R_d$ have the previously-given meaning, $R_o$ stands for lower alkyl, particularly methyl, as well as ethyl, n-propyl, isopropyl and the like, and X is primarily sulfur, as well as oxygen, or acid addition salts thereof. The latter, which are employed in preference over the free base, are primarily those with mineral acids, such as hydrochloric, hydrobromic, or particularly sulfuric acid and the like. The preferred reagents are the S-methyl-isothioureas, especially the mineral acid addition salts thereof, such as the sulfates. The starting material is preferably used in the form of the free base.

The above reaction is carried out by contacting the starting material with the reagent, preferably in the presence of a solvent, the choice of which depends primarily on the solubility of the reactants. Water or water-miscible organic solvents, such as lower alkanols, e.g. methanol, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamides, e.g. formamide, dimethylformamide and the like, or aqueous mixtures of such solvents are preferred diluents. The reaction may be carried out at room temperature, or, if necessary, at an elevated temperature, for example, on the steam bath or at the boiling temperature of the solvent, and/or, in the atmosphere of an inert gas, e.g. nitrogen.

Another reagent capable of transforming an amino group into a guanidino group, is a cyanamide compound of the formula:

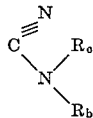

in which $R_b$ and $R_c$ have the previously-given meaning. For example, a mixture of the cyanamide compound with the amine compound, which is preferably used in the form of a salt thereof, particularly a mineral acid addition salt, e.g. hydrochloride, hydrobromide, sulfate and the like, may be heated to form a melt, which is then dissolved in a solvent, such as a lower alkanoic acid, e.g. acetic acid and the like, and the desired product may be isolated. The reaction may also be performed in the presence of a suitable solvent, such as a lower alkanol, e.g. ethanol and the like. The salt used as the starting material may also be formed in situ by performing the reaction in the presence of an acid, particularly of a concentrated aqueous mineral acid, e.g. hydrochloric acid and the like. The cyanamide reagent too may be formed in situ; for example, 1-nitroso-3-methyl-guanidine may furnish the N-methyl-cyanamide during the reaction, and the latter then reacts with the amine to form the desired guanidino compound. The reaction may proceed exothermically, if necessary, may be maintained by heating, for example, to from about 80° to about 200°; the atmosphere of an inert gas, e.g. nitrogen, may be advantageous.

A third modification of the above procedure for the manufacture of the guanidine compounds of this invention comprises reacting an amine having the above-given formula with a salt of a 1-guanyl-pyrazole. A salt of a 1-guanyl-pyrazole is primarily a salt with a mineral acid, such as, for example, nitric acid and the like; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like, if necessary, while heating and in the atmosphere of an inert gas, e.g. nitrogen.

The starting materials used in the above procedure may be prepared according to known methods. For example, a compound of the formula R—H, in which R has the previously-given meaning, may be reacted with a cyano-lower alkyl halide, e.g. chloride or bromide, in the presence of a metal, particularly alkali metal, salt-forming reagent, such as an alkali metal carbonate, e.g. sodium carbonate, potassium carbonate and the like, and in the resulting compound the cyano group is converted into an aminomethyl group by reduction, for example, by treatment with a suitable complex hydride, e.g. lithium aluminum hydride and the like, or with catalytically activated hydrogen, such as hydrogen in the presence of a platinum catalyst, to form the desired amine starting material. Starting materials, particularly those in which the amino group carries a substituent $R_a$, may be prepared by reacting a compound of the formula R—H, in which R has the previously-given meaning, with a halogeno-lower alkanol in the presence of a salt-forming reagent, converting in a resulting compound the free hydroxyl group into halogeno, for example, by treatment with a thionyl halide, e.g. thionyl chloride, and reacting the resulting halide compound with ammonia or especially an amine of the formula $R_a$—$NH_2$, if necessary, in the presence of a neutralizing reagent.

The compounds of this invention may also be prepared by converting in an amine of the formula:

$$R-A-N-R_x$$
$$|$$
$$R_a$$

in which R, A and $R_a$ have the above-given meaning, and $R_x$ represents a substituent capable of being converted into an amidino group, or a salt thereof, the group $R_x$ into an amidino group of the formula:

$$-C\begin{matrix}N-R_d\\ \diagdown_N\diagup R_c\\ |\\ R_b\end{matrix}$$

in which $R_b$, $R_c$ and $R_d$ have the previously-given meaning, and, if desired, carrying out the optional steps.

Depending on the characteristics of the substituent $R_x$, its conversion into an amidino group may be carried out according to different modifications.

For example, the substituent $R_x$ may contain a carbon atom, which is attached to the nitrogen atom of the amino group, and to such carbon atom there may be connected a nitrogen atom; said carbon atom may carry an additional nitrogen atom, as well as other hetero atoms, such as, for example, oxygen or sulfur. The substituent $R_x$ may be represented, for example, by cyano of the formula —C≡N, carbamyl of the formula —CON($R_b$)—$R_c$, in which $R_b$ and $R_c$ have the above-given meaning, thiocarbamyl of the formula —CSN($R_b$)—$R_c$, lower alkoxy-(imino)methyl of the formula —C(=N—$R_d$)—$OR_o$, in which $R_d$ and $R_o$ have the previously-given meaning, lower alkylmercapto-(imino)methyl of the formula $$—C(=N—R_d)—SR_o,$$

cyano-amidino of the formula $$—C(=N—R_d)—N(R_b)—C≡N,$$

guanidino-(imino)methyl of the formula $$—C(=N—R_d)—[—N(R_b)—C(=NH)—NH_2],$$

isocyano-(imino)methyl of the formula $$—C(=N—R_d)—N=C=O$$

or isothiocyano-(imino)methyl of the formula $$—C(=N—R_d)—N=C=S$$

and the like.

Together with the amino portion of the formula R—A—N($R_a$)—, the substituent $R_x$ forms a cyanamide, urea, thiourea, O-lower alkyl-isourea, S-lower alkyl-isothiourea, cyanoguanidine, biguanide, cyanourea or cyanothiourea derivative and the like. All of these compounds have the above characteristic, i.e. to the amino group of the amine is attached a carbon atom, which carries at least one nitrogen atom, apart from other nitrogen or hetero atoms.

The greater part of these starting materials may be converted into the desired guanidino derivatives by ammonolysis or aminolysis.

For example, a cyanamide may be converted into a guanidino derivative by treatment with ammonia, an ammonia-furnishing reagent or an amine. This reaction may be carried out, for example, by treating the cyanamide compound with liquid ammonia or an amine under pressure and at an elevated temperature, if desired, in the presence of an anion capable of forming a stable salt with a resulting guanidine; ammonium acetate, ammonium sulfate, ammonium chloride and the like, may be used as anion sources. Ammonia may be replaced by ammonia furnishing ammonium salts; such salts are, for example, ammonium monohydrogen phosphate, which may be used under pressure and at an elevated temperature, or ammonium nitrate, whereby a salt, such as, for example, an alkali metal, e.g. sodium, potassium and the like, salt of the cyanamide starting material is preferably used, which reacts with ammonium nitrate in the presence of catalytic amounts of water.

The starting materials may be prepared, for example, by treating an amine having the previously-given formula, with a cyanogen halide, e.g. cyanogen chloride, cyanogen bromide and the like, advantageously in equivalent amounts and preferably in an inert solvent, such as, for example, diethylether and the like.

A carmabyl substituent $R_x$ in an amine of the formula R—A—N($R_a$)—$R_x$ in which R, A and $R_a$ have the previously-given meaning, may be converted into the desired amidino group by treatment with ammonia or an amine, preferably, in the presence of a dehydrating agent, such as, for example, phosphorous pentoxide and the like. This reaction may be carried out at an elevated temperature in a closed vessel; temperature and pressure may be reduced in the presence of a non-aqueous solvent and/or of a reaction accelerator, such as finely dispersed nickel, aluminum, aluminum oxide and the like. Furthermore, a thiocarbamyl group $R_x$, which together with the amino group of the amine forms a thiourea group, may be converted into an amidino group by treatment with ammonia or an amine, for example, in the presence of water and/or of a nonhydrolytic solvent, such as, for example, toluene and the like, and in the presence of a desulfurizing agent. The latter is selected advantageously from basic oxides, basic carbonates and the like, of heavy metals, such as lead, zinc, cadmium, tin, mercury and the like; desulfurizing reagents are, for example, lead oxide, mercuric oxide, lead hydrogen carbonate and the like; mercuric chloride may also be used. This ammonolysis or amminolysis procedure is preferably carried out at an elevated temperature, and, if necessary, in a closed vessel, primarily to avoid loss of ammonia or the amine.

Ureas and thioureas used as the starting material in the above-mentioned modification of the procedure or salts thereof may be obtained, for example, from an amine of the formula R—A—NH—$R_a$ in which R, A and $R_a$ have the previously-given meaning, by treating the latter with an ammonium or a metal, such as alkali metal, e.g. sodium, potassium, and the like, cyanate or thiocyanate. These reagents are preferably used in the presence of a solvent, for example, water, if desired, containing a small amount of an acid, such as a mineral acid, e.g. hydrochloric, sulfuric acid and the like.

The above-mentioned urea or thiourea starting materials may also be obtained by ammonolysis or aminolysis of reactive functional derivatives of N—(R—A—)-carbamic acids, as well as N—(R—A—)-thiocarbamic acids, in which R and A have the previously-given meaning. Such reactive functional derivatives are primarily esters, for example, lower alkyl, e.g. methyl, ethyl and the like, esters or halides, e.g. chlorides and the like, or such acids. Upon ammonolysis of aminolysis, if necessary, at an elevated temperature in a closed vessel, these carbamic and thiocarbamic acids yield the desired urea or thiourea derivative, respectively.

The group of N—(R—A—)—O— lower alkyl-isoureas and N—(R—A—)—S— lower alkyl-isothioureas or salts thereof, are compounds having the above-mentioned O-lower alkoxy-(imino)methyl group of the formula $$—C(=N—R_d)—OR_o$$

and S-lower alkyl mercapto-(imino)methyl group of the formula —C(=N—$R_d$)—$SR_o$, respectively, in which $R_d$ and $R_o$ have the previously-given meaning; these compounds are, therefore, useful as starting materials in the preparation of the compounds of this invention. They may be converted into the latter, for example, by ammonolysis or aminolysis. Ammonolysis may be carried out by treatment with ammonia, either in its liquid form or in a solution, such as an aqueous solution, thereof, whereby an elevated temperature and/or a closed vessel, as well as the presence of an ammonium salt, such as ammonium chloride and the like, may be required. If necessary, dehydrating agents or desulfurizing agents, such as those previously described, may be present in the reaction medium, depending on the type of starting material used.

The isourea and isothiourea compounds used as the starting materials in the above-reaction may be obtained, for example, from the previously-mentioned urea and thiourea derivatives by treatment of the latter, or of a metal salt thereof, such as an alkali metal, e.g. sodium, potassium and the like, salt thereof, with a lower alkyl halide, e.g. methyl or ethyl chloride, bromide or iodide and the like, or with a di-lower alkyl sulfate, e.g. dimethyl sulfate, diethyl sulfate and the like. Such reaction may be carried out in the presence of a solvent, the selection of which depends on the type of reagents used; a free urea or thiourea compound may be used in the presence of water or a lower alkanol, e.g. methanol, ethanol and the like, whereas an alkali metal salt of the urea or thiourea compound may be reacted in the presence of a hydrocarbon, e.g. toluene and the like, solution.

A cyanamidino substituent $R_x$, which forms a cyanoguanidino group with the amino group of an amine of the formula $R-A-N(R_a)-R_x$ in which R, A and $R_a$ have the previously-given meaning, may be converted into an amidino group by ammonolysis or aminolysis. This reaction may be carried out by treatment with ammonia, as well as with an ammonium salt, e.g. ammonium chloride, ammonium nitrate, ammonium sulfate and the like, whereby these salts may also promote ammonolysis with ammonia itself, or by treatment with an amine.

In the ammonolysis or aminolysis procedure of a cyanoguanidino to a guanidino derivative as described above, a biguanido group may be formed intermediarily, which, upon further treatment with the ammonolysis or aminolysis reagent, may be converted into the desired guanidino group. Such biguanido derivatives may be accessible through different routes (as will be shown below) and are, therefore, also useful as starting materials in the formation of the desired guanidino compounds by treatment with one of the ammonolysis or aminolysis reagents.

A cyano-guanidino derivative may also be converted into the desired guanidino compound by reductive cleavage of the cyano group. Such cleavage may be carried out, for example, by electrolytic reduction on a cathode, such as, for example, a lead cathode.

The cyanoguanidino derivatives or their salts, used as the starting materials in the above ammonolysis, aminolysis or reduction procedure, may be prepared by treatment of an S-lower alkyl-cyano-isothiourea with ammonia or an amine, for example, in the presence of a lower alkanol, e.g. ethanol and the like, preferably in a sealed tube.

Since the previously-described cyano-guanidino derivatives are obtained by ammonolysis or aminolysis from S-lower alkyl-cyanoisothiourea compounds, the latter may, therefore, serve directly as starting materials for the preparation of the desired guanidino compounds of this invention. Ammonolysis or aminolysis of the cyanoisothiourea compounds to the latter may be carried out by treatment with ammonia or an amine in the presence of the anion of a strong acid, such as of a hydrohalic, nitric, sulfuric acid and the like, for example, in the presence of the respective ammonium salts of such acids.

The S-lower alkyl-cyanoisothioureas or their salts may be obtained, for example, by treating an R—A-isothiocyanate, in which R and A have the previously-given meaning, with an alkali metal, e.g. sodium, cyanamide and alkylating a resulting 1-R-A-3-cyano-2-thiourea, preferably a salt thereof, with a lower alkyl halide, e.g. methyl or ethyl chloride, bromide or iodide and the like, or with a di-lower alkyl sulfate, e.g. di-methyl sulfate, diethyl sulfate and the like.

As has been shown, ammonolysis or aminolysis of cyanoguanidines may give rise to the formation of biguanido compounds or salts thereof. These compounds may also be prepared, for example, by reacting an amine of the formula $R-A-NH-R_a$, in which R, A and $R_a$ have the previously-given meaning, with dicyano-diamide, preferably in the presence of a complex metal-forming salt, e.g. copper sulfate and the like. A resulting biguanido complex metal salt, such as to copper complex salt thereof, may be broken by treatment with an acid, such as a mineral acid, e.g. sulfuric acid and the like, to form the free compound. As previously-described, ammonolysis or aminolysis of these biguanido derivatives gives rise to the formation of the desired guanidine compounds of this invention.

In addition to these ammonolysis and aminolysis reactions, the guanidino compounds may also be obtained by hydrolysis of a compound of the formula $$R-A-N(R_a)-R_x$$

in which R, A and $R_a$ have the previously-given meaning, and $R_x$ represents a substituent capable of being hydrolyzed to an amidino group. For example, such substitutent forms together with the amino group of the amine a cyanourea or a cyanothiourea group of the formulae $-C(=N-R_a)-N=C=O$ and $$-(C=N-R_d)-N=C=S$$

respectively, in which $R_d$ has the previously-given meaning. Compounds containing such groups yield upon treatment with a hydrolytic reagent, particularly with a dilute mineral acid, such as aqueous sulfuric acid and the like, the desired guanidino compounds. In such a hydrolysis reaction, the desired guanidine derivative may be formed simultaneously with biuret derivative as the by-product.

Cyanourea or cyanothiourea compounds or salts thereof, which are used as the starting materials in the above hydrolysis procedure, may be obtained, for example, by reacting a suitable cyanamide with a metal cyanate or thiocyanate, particularly an alkali metal, e.g. sodium or potassium, cyanate or thiocyanate in a neutral medium, for example, in the presence of water.

Apart from amines of the formula $R-A-N(R_a)-R_x$, in which R, A and $R_a$ have the previously-given meaning, and in which a carbon atom with a substituting nitrogen atom of the group $R_x$ is attached to the amino group, other $R-A-N(R_a)-R_x$, in which the group $R_x$ represents a substituent convertible into an amidino group, may be useful in the conversion into the desired guanidine compounds. In such a conversion intermediates may be formed, which may have the previously-given characteristics, i.e. the carbon atom of the group $R_x$ carries a nitrogen atom. Such groups are, for example, ester groups, formed by a carboxyl, a thionocarboxyl, a thiolocarboxyl or a dithiocarboxyl group with a lower alkanol, as well as helogeno-carbonyl or halogeno-thionocarbonyl groups, in which halogeno represents primarily chloro. Particularly useful starting materials are, for example, the reactive functional derivatives of carbamic acids and thiocarbamic acids or salts therof. As shown hereinabove, esters, for example, lower alkyl, e.g. methyl, ethyl and the like, esters, or halides, e.g. chlorides, of such acids yield upon ammonolysis the corresponding urea and thiourea derivatives. However if, for example, the ammonolysis or aminolysis of a carbamic acid ester is carried out in the presence of a dehydrating agent, such as, for example, previously-described in the conversion of urea derivatives to guanidines, an $N-(R-A-)$-carbamic acid ester may be converted directly into the desired guanidino compound. Or, an ester of an $N-(R-A-)$-thiocarbamic acid may be subjected to ammonolysis or aminolysis to yield directly the desired guanidino compound, for example, in the presence of a desulfurizing reagent, such as one of those previously shown in the conversion of a thiourea derivative into the desired guanidino compound, e.g. lead oxide and the like.

The carbamic and thiocarbamic acid derivatives used as the starting materials may be prepared according to known methods. For example, upon treatment of an amine having the previously-shown formula with phosgene or thiophosgene, which reagents may be used in a slight excess over the amines, the R—A—iso-cyanates and R—A-isothiocyanates, respectively, may be formed. Such iso-cyanate and isothiocyanate compounds may then be converted into esters of carbamic or thiocarbamic acids by treatment with an alcohol, for example, a lower alkanol, e.g. methanol, ethanol and the like, or into the corresponding thiolesters, by treatment with a mercaptan, such as a lower alkyl-mercaptan, e.g. methylmercaptan, ethylmercaptan and the like. The above derivatives may also be obtained by reacting an amine having the previously-given formula with a carbonic acid lower alkyl ester or, particularly, a dithiocarbonic acid lower alkyl ester, as well as with a lower alkyl ester of a halogeno-formic acid, such as chloroformic acid, or, primarily, of a halogeno-thioformic acid, such as chlorothioformic acid.

Or, a salt of an amine having the previously-shown formula, particularly a hydrohalide, e.g. hydrochloride, thereof, when reacted with phosgene or thiophosgene at an elevated temperature, preferably in a closed vessel, yields the desired N—(R—A—)-carbamic acid chloride and N—(R—A—)-thiocarbamic acid chloride, respectively.

A resulting salt may be converted into the free compound in the customary way, for example, by treatment with a strong alkaline reagent, such as aqueous alkali metal hydroxide, e.g. lithium, sodium, potassium hydroxide and the like, a strong quaternary ammonium anion (hydroxyl ion) exchange resin and the like.

A resulting salt may be converted into another salt according to known methods. For example, a basic salt may be converted into a neutral salt by treatment with an acid, or a resulting salt may be treated with a suitable anion exchange resin or with an alkali metal or silver salt of an acid and another salt may be formed.

A free compound may be transformed into an acid addition salt, for example, by reacting it (preferably a solution thereof in an inert solvent or solvent mixture) with an appropriate inorganic or organic acid or a solution thereof and insolating the salt. Semi-, mono- or poly-salts may be formed, as well as mixed salts.

In a resulting guanidine compound having the previously-given formula, in which the group $R_c$ and/or $R_d$ attached to nitrogen atoms of the guanidino portion stand for hydrogen, such groups may be replaced by an acyl group according to known methods, for example, by treatment with an organic carboxylic acid anhydride or an organic carboxylic acid halide, particularly chloride.

In a resulting guanidine compound having a double bond in the ring system, such double bond may be removed by reduction according to known methods, for example, by hydrogenation in the presence of a catalyst containing a metal of the eighth group of Periodic System, such as platinum oxide and the like.

The invention also comprises any modification of the general process, wherein a compound obtainable as an intermediate at any stage of the process is used as the starting material and the remaining step(s) of the process is(are) carried out; also inncluded within the scope of the invention are any new intermediates.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

Example 1

A solution of 3.5 g. of 2-(2-aminoethyl)-1,3,3a,7a-tetrahydro-exo-4,7-methano-isoindole and 2.8 g. of S-methyl-isothiourea sulfate in 3 ml. of water is heated for 4 hours and then allowed to stand overnight. The white solid material is filtered off to yield the 2-(2-guanidino-ethyl)-1,3,3a,7a-tetrahydro-exo-4,7-methano-isoindole sulfate of the formula:

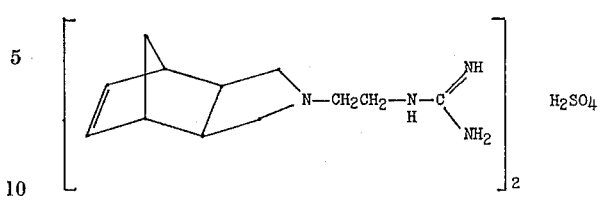

which is recrystallized from 95 percent ethanol, M.P. 242–250° (with decomposition); yield: 2.1 g.

The starting material is prepared as follows: A mixture of 20.0 g. of 1,3,3a,7a-tetrahydro-4,7-methano-isoindole (prepared according to the method described by Culberson et al., J. Org. Chem., vol. 25, p. 1358 (1960)), 12.5 g. of chloroacetonitrile and 43 g. of sodium carbonate in 2 ml. of water and 450 ml. of toluene is refluxed for twelve hours while stirring. After standing overnight at room temperature, the reaction mixture is heated again and filtered; the solid material is washed with benzene and the washing is combined with the filtrate. The solvent is evaporated and the residue is distilled to yield 19.8 g. of 2 - cyanomethyl - 1,3,3a,7a - tetrahydro-exo-4,7-methano-isoindole, B.P. 146–148°/14 mm.; 6.2 g. of the starting material is also recovered.

A solution of 9.8 g. of 2-cyanomethyl-1,3,3a,7a-tetrahydro-exo-4,7-methano-isoindole in 100 ml. of diethyl ether is added while stirring to 4.3 g. of lithium aluminum hydride in 150 ml. of diethyl ether. After standing overnight, the reaction mixture is treated with 12.9 ml. of ethyl acetate, 4.3 ml. of water, 8.6 ml. of a 15 percent aqueous solution of sodium hydroxide and again with 12.9 ml. of water. The reaction mixture is filtered, the residue is washed and the solvent is removed from the combined filtrate and washing solution to yield the 2-(2-aminoethyl)-1,3,3a,7a-tetrahydro-exo - 4,7 - methano-isoindole, which is purified by distillation, B.P. 125–131°/14 mm.; yield: 7.8 g.

Example 2

A solution of 4.0 g. of crude 2-(2-aminoethyl)-1,3,3a,-5,6,7a-hexahydro-exo-4,7-methano-isoindole and 3.1 g. of S-methyl-isothiourea sulfate in 4 ml. of water is refluxed for four hours and then allowed to stand overnight. The solid material is filtered off and recrystallized from anhydrous ethanol to yield the 2-(2-guanidino-ethyl)-1,3,3a,5,6,7a-hexahydro-exo-4,7-methano-isoindole sulfate of the formula:

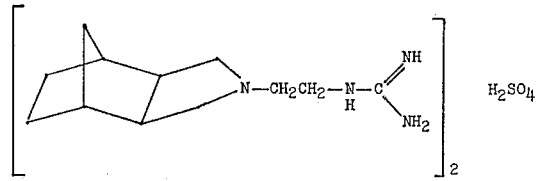

which melts at 244–246° (with decomposition); yield: 3.1 g. From the filtrate 2.4 g. of the 2-(2-guanidino-ethyl)-1,3,3a,5,6,7a-hexahydro-exo-4,7-methano - indole sulfate trihydrate, M.P. 190–195° (with decomposition), can be isolated.

The starting material may be prepared as follows: A mixture of 4.3 g. of 2-(2-aminoethyl)-1,3,3a,7a-tetrahydro-exo-4,7-methano-isoindole and 0.5 g. of platinum oxide in 30 ml. of ethanol is treated with hydrogen at a pressure of 3 atmospheres. The crude 2-(2-aminoethyl)-1,3,3a,5,6,7a-hexahydro-exo-4,7-methano-isoindole is isolated by filtration of the reaction mixture and removal of the solvent from the filtrate.

Example 3

A mixture of 4.9 g. of 2-(2-aminoethyl)-1,3,3a,7a-tetrahydro-endo-4,7-methano-isoindole and 3.8 g. of S-methylisothiourea sulfate in 5.0 ml. of water is refluxed for five hours. After standing overnight at room temperature, the crystalline 2-(2-guanidinoethyl) - 1,3,3a,7a - tetrahydro-endo-4,7-methano-isoindole sulfate of the formula:

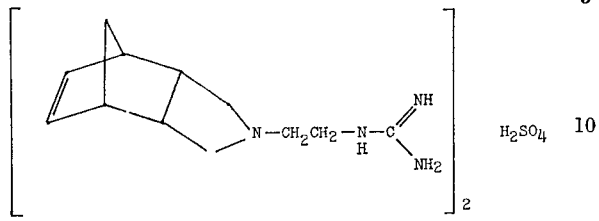

is filtered off and recrystallized from anhydrous ethanol, M.P. 235–237° (with decomposition) as the dihydrate; yield: 4.0 g.

The starting material is prepared as shown in Example 1, i.e. on reaction with chloroacetonitrile in the presence of sodium carbonate, the 1,3,3a,7a-tetrahydro-endo-4,7-methano-isoindole yields the 2-cyanomethyl-1,3,3a,7a-tetrahydro-endo-4,7-methano-isoindole, B.P. 148–150°/16 mm., which is treated with lithium aluminum hydride to form the 2-(2-aminoethyl)-1,3,3a,7a-tetrahydro-endo-4,7-methano-isoindole, B.P. 132–134°/13 mm.

Example 4

A solution of 5.7 g. of 2-(2-aminoethyl)-1,3,3a,5,6,7a-hexahydro-endo-4,7-methano-isoindole and 4.5 g. of S-methyl-isothiourea sulfate in 7 ml. of water is refluxed for five hours; the crystalline product formed after standing at room temperature opernight is filtered off and recrystallized from anhydrous ethanol to yield the desired 2-(2-guanidino-ethyl)-1,3,3a,5,6,7a-hexahydro-endo - 4,7-methano-isoindole sulfate of the formula:

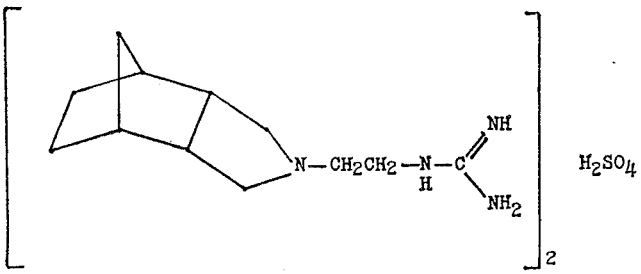

which melts at 270–272° (with decomposition); yield: 6.0 g.

The starting material may be prepared by treating the 1,3,3a,7a-tetrahydro-endo-4,7-methano-isoindole with hydrogen in the presence of platinum oxide according to the procedure described in Example 2 to form the 1,3,3a,5,-6,7a-hexahydro-endo-4,7-methano-isoindole, which is then reacted with chloro-aceto-nitrile in the presence of sodium carbonate according to the method described in Example 1, the resulting 2-cyanomethyl-1,3,3a,5,6,7a-hexahydro-endo-4,7-methano-isoindole, B.P. 150°/17 mm., is converted into the desired 2-(2-aminoethyl)-1,3,3a,5,6,7a-hexahydro-endo-4,7-methano-isoindole, B.P. 134–140°/ 13–14 mm., by treatment with lithium aluminum hydride.

Other compounds which are prepared according to the above procedure are, for example, 2-(3-guanidino-propyl)-1,3,3a,7a-tetrahydro-exo-4,7-methano-isoindole,
2-(3-guanidino-propyl)-1,3,3a,5,6,7a-hexahydro-endo-4,7-methano-isoindole,
2-(2-guanidino-ethyl)-1,3,3a,7a-tetrahydro-exo-4,7,-2,2-propano)-isoindole,
2-(3-guanidino-propyl)-1,3,3a,5,6,7a-hexahydro-endo-4,7-(2,2-propano)-isoindole,
2-(2-guanidino-ethyl)-1,3,3a,7a-tetrahydro-exo-4,7-isoindole,
2-(2-guanidino-ethyl)-1,3,3a,5,6,7a-hexahydro-endo-4,7-oxy-isoindole and the like, which compounds are preferably isolated in the form of their acid addition salts, e.g. sulfates and the like.

What is claimed is:

1. A pharmaceutically acceptable non-toxic acid addition salt of a compound of the formula:

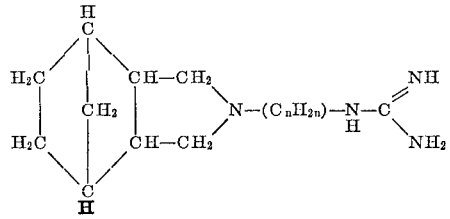

in which the letter $n$ stands for an integer from 2 to 3 and the group —$(C_nH_{2n})$— separates the guanidino group from the imino-nitrogen by from two to three carbon atoms.

2. A pharmaceutically acceptable, non-toxic acid addition salt of 2-(2-guanidino-ethyl)-1,3,3a,5,6,7a-hexahydro-endo-4,7-methano-isoindole.

3. 2-(2-guanidino-ethyl)-1,3,3a,5,6,7a-hexahydro-endo-4,7-methano-isoindole sulfate.

4. 2-(2-guanidino-ethyl)-1,3,3a,5,6,6a-hexahydro-exo-4,7-methano-isoindole.

5. A pharmaceutically acceptable, non-toxic acid salt of 2-(2-guanidino-ethyl)-1,3,3a,5,6,7a-hexahydro-exo-4,7-methano-isoindole.

6. 2-(2-guanidino-ethyl)-1,3,3a,5,6,7a-hexahydro-exo-4,7-methano-isoindole sulfate.

7. A pharmaceutically acceptable non-toxic acid addition salt of a compound of the formula:

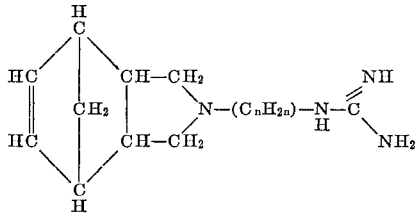

in which the letter $n$ stands for an integer from 2 to 3 and the group —$(C_nH_{2n})$— separates the guanidino group from the imino-nitrogen by from two to three carbon atoms.

8. A pharmaceutically acceptable, non-toxic acid addition salt of 2-(2-guanidino-ethyl)-1,3,3a,7a-tetrahydro-endo-4,7-methano-isoindole.

9. 2-(2-guanidino-ethyl)-1,3,3a,7a-tetrahydro-endo-4,7-methano-isoindole sulfate.

10. 2-(2-guanidino-ethyl)-1,3,3a,7a-tetrahydro-exo-4,7-methano-isoindole.

11. A pharmaceutically acceptable, non-toxic acid addition salt of 2-(2-guanidino-ethyl)-1,3,3a,7a-tetrahydro-exo-4,7-methano-isoindole.

12. 2-(2-guanidino-ethyl)-1,3,3a,7a-tetrahydro-exo-4,7-methano-isoindole sulfate.

13. A compound of the formula
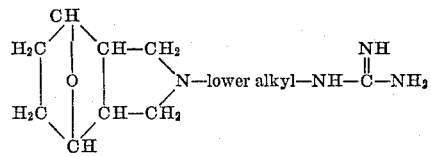
14. 2-(guanidino-lower alkyl)-1,3,3a,5,6,7a-hexahydro-endo-4,7-oxy-isoindole.
15. 2 - cyanomethyl-1,3,3a,5,6,7a - hexahydro-endo-4,7-methano-isoindole.
References Cited
UNITED STATES PATENTS
2,928,829   3/1960   Mull _____ 260—239
NICHOLAS S. RIZZO, *Primary Examiner.*
J. A. NARCAVAGE, *Assistant Examiner.*
U.S. Cl. X.R.
167—65

CASE SU-333

PO-1050
(5/69)

UNITED STATES PATENT OFFICE
CERTIFICATE OF CORRECTION

Patent No. 3,415,842      Dated December 10, 1968

Inventor(s) RENAT HERBERT MIZZONI ET AL

It is certified that error appears in the above-identified patent and that said Letters Patent are hereby corrected as shown below:

Column 12, line 29, "6a" should read -- 7a --

Column 13, in the formula $$\overset{CH}{\diagup\vert\diagdown} \quad \text{should read} \quad \overset{CH}{\diagup\vert\diagdown}$$

SIGNED AND
SEALED
NOV 17 1970

(SEAL)
Attest:

Edward M. Fletcher, Jr.
Attesting Officer

WILLIAM E. SCHUYLER, JR.
Commissioner of Patents